US009448302B2

(12) United States Patent
Schoor et al.

(10) Patent No.: US 9,448,302 B2
(45) Date of Patent: Sep. 20, 2016

(54) METHOD FOR OPERATING A MIMO RADAR

(71) Applicants: Michael Schoor, Stuttgart (DE); Goetz Kuehnle, Hemmingen (DE); Kilian Rambach, Stuttgart (DE); Benedikt Loesch, Stuttgart (DE)

(72) Inventors: Michael Schoor, Stuttgart (DE); Goetz Kuehnle, Hemmingen (DE); Kilian Rambach, Stuttgart (DE); Benedikt Loesch, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 263 days.

(21) Appl. No.: 14/284,998

(22) Filed: May 22, 2014

(65) Prior Publication Data
US 2014/0347211 A1    Nov. 27, 2014

(30) Foreign Application Priority Data
May 24, 2013 (DE) .......... 10 2013 209 708

(51) Int. Cl.
G01S 13/42    (2006.01)
G01S 13/02    (2006.01)
(Continued)

(52) U.S. Cl.
CPC .......... *G01S 13/02* (2013.01); *G01S 7/35* (2013.01); *G01S 7/4008* (2013.01); *G01S 13/003* (2013.01); *G01S 13/42* (2013.01); *G01S 13/931* (2013.01); *G01S 13/343* (2013.01); *G01S 2007/403* (2013.01); *G01S 2007/4034* (2013.01)

(58) Field of Classification Search
CPC ........ G01S 13/02; G01S 7/4008; G01S 7/35; G01S 13/003; G01S 13/931; G01S 13/42; G01S 13/343; G01S 2007/403; G01S 2007/4034; H01Q 3/2629; H04B 7/0452; H04B 7/0617; H04B 7/0626
USPC .............. 342/147, 70–72, 107–113, 195
See application file for complete search history.

(56) References Cited

U.S. PATENT DOCUMENTS 7,714,782 B2 * 5/2010 Davis ............... H01Q 21/22
342/377
8,390,507 B2    3/2013 Wintermantel
(Continued)

FOREIGN PATENT DOCUMENTS

DE    102013209708 A1 * 11/2014 ............. G01S 7/35

OTHER PUBLICATIONS

C. Chen, X. Zhang and D. Ben, "Coherent angle estimation in bistatic multi-input multi-output radar using parallel profile with linear dependencies decomposition," in IET Radar, Sonar & Navigation, vol. 7, No. 8, pp. 867-874, Oct. 2013.*
(Continued)

Primary Examiner — John B Sotomayor
(74) Attorney, Agent, or Firm — Norton Rose Fulbright US LLP

(57) ABSTRACT

In a method for operating a MIMO radar, an influence of an object motion on an angle estimate is substantially eliminated, and a time multiplex schema having a transmission sequence and transmission instants of transmitters of the MIMO radar is identified by optimizing the following mathematical relationship:

$$d^{pulses,opt} = \arg\max_{d^{pulses}} \left[ \mathrm{Var}^S(d^{pulses}) - (\mathrm{Cov}^S(d^{pulses}, t))^2 / \mathrm{Var}^S(t) \right]$$

in which: $d^{pulses,opt}$ is optimized positions of the transmitters in the sequence in which they transmit; $d^{pulses}$ is positions of the transmitters in the sequence in which they transmit; t is transmission instants; $\mathrm{Var}^S$ is sample variance; and $\mathrm{Cov}^S$ is sample covariance.

9 Claims, 6 Drawing Sheets

(51) Int. Cl.
*G01S 7/35* (2006.01)
*G01S 13/00* (2006.01)
*G01S 13/93* (2006.01)
*G01S 7/40* (2006.01)
*G01S 13/34* (2006.01)

(56) References Cited

U.S. PATENT DOCUMENTS 9,312,929 B2 * 4/2016 Forenza .................. H04B 7/024
2014/0347211 A1 * 11/2014 Schoor ...................... G01S 7/35
342/147

2016/0131742 A1 * 5/2016 Schoor .................... G01S 7/352
342/128

OTHER PUBLICATIONS

I. Pasya, N. Iwakiri and T. Kobayashi, "Joint direction-of-departure and direction-of-arrival estimation in an ultra-wideband MIMO radar system," 2014 IEEE Radio and Wireless Symposium (RWS), Newport Beach, CA, 2014, pp. 52-54.*
R. Feger, C. Wagner, S. Schuster, S. Scheiblhofer, H. Jäger, A. Stelzer: "A 77-GHz FMCW MIMO Radar Based on a SiGe Single-Chip Transceiver," 2009.

* cited by examiner

METHOD FOR OPERATING A MIMO RADAR

BACKGROUND OF THE INVENTION

1. Field of the Invention

The invention relates to a method for operating a MIMO radar, e.g., a use of a MIMO radar in the automotive sector.

2. Description of the Related Art

Radar systems are used in motor vehicles in order to determine distances and relative velocities of objects in the vicinity of the motor vehicles. The aforesaid radar systems can be used in order to implement convenience functions (for example adaptive cruise control [ACC]) and safety functions (for example to warn the driver in critical situations or to cause maximum braking when a collision can no longer be avoided).

For these applications, the distance and the relative velocity of the objects, and the angle of the reflected radar waves, must be precisely identified. An exact estimate of the angle, or direction of arrival (DOA), should in particular be carried out for this purpose. The angle to be estimated can be an azimuth angle and/or an elevation angle. Multiple-input/multiple-output (MIMO) radar systems having multiple transmitting and receiving antennas offer the advantage, as compared with conventional single-input/multiple-output (SIMO) radar systems, of a larger virtual aperture for the same or smaller geometric size. Greater accuracy for the estimated DOA can therefore normally be achieved with a MIMO radar.

In general, however, the accuracy of DOA estimates in a MIMO radar decreases when the object is moving relative to the radar, since the motion generates an unknown phase change (Doppler phase) in the baseband signal because of the Doppler effect.

R. Feger, C. Wagner, S. Schuster, S. Scheiblhofer, H. Jäger, A. Stelzer: "A 77-GHz FMCW MIMO Radar Based on a SiGe Single-Chip Transceiver," 2009, discloses a MIMO radar in which receiving and transmitting antennas are positioned in such a way that at least two antenna elements of a virtual array have the same geometric position ("redundant position"). An unknown phase change (Doppler phase) in the baseband signal due to a target motion is estimated by calculating the phase difference of the antenna elements at the redundant positions. The estimated Doppler phase is then used as a correction in an algorithm for angle estimation.

Only antenna elements at the redundant positions are used, however, to identify the unknown Doppler phase. Then all the antenna elements are used in order to identify the angle at which the signal is arriving. Noise in the antenna elements at the redundant positions therefore has a greater influence on the DOA estimate than noise in the remaining antenna elements. Depending on the time multiplex schema used, and on the disposition of the antennas, a DOA estimate of such a system can in fact be poorer than utilization of an individual transmitting antenna.

M. Wintermantel: "Radar System with Elevation Measuring Capability," 2010, discloses a MIMO radar system having multiple transmitting and receiving antennas. The transmitting antennas transmit numerous short-duration chirp sequences, for example 512 or 1,024 chirps each having a duration of, for example, 10 μs. The transmitters transmit sequentially or simultaneously, but with different phase modulations. The spacing, relative velocity, and DOA are estimated using a three-dimensional discrete Fourier transform. The proposed system can carry out only inaccurate angle estimates, however, and furthermore cannot be used at all with a frequency modulated continuous wave (FMCW) radar having long ramps. The hardware is moreover relatively complex and laborious to implement because of the chirp-sequence principle with rapid frequency changes.

BRIEF SUMMARY OF THE INVENTION

The object of the present invention is therefore to furnish an improved method for operating a MIMO radar.

The object is achieved, in accordance with a first aspect, with a method for operating a MIMO radar, an influence of an object motion on an angle estimate being substantially eliminated, a time multiplex schema having a transmission sequence and transmission instants of transmitters of the MIMO radar being identified by optimizing the following mathematical relationship:

$$\underline{d}^{pulses,opt} = \arg\max_{\underline{d}^{pulses}} \left[ \mathrm{Var}^S(\underline{d}^{pulses}) - (\mathrm{Cov}^S(\underline{d}^{pulses}, t))^2 / \mathrm{Var}^S(t) \right]$$

having the parameters:
$d^{pulses,opt}$ . . . optimized positions of the transmitters in the sequence in which they transmit
$d^{pulses}$ . . . positions of the transmitters in the sequence in which they transmit
t . . . transmission instants
$\mathrm{Var}^S$ . . . sample variance
$\mathrm{Cov}^S$ . . . sample covariance.

According to a second aspect, the object is achieved with a method for operating a MIMO radar, an influence of an object motion on an angle estimate being substantially eliminated, a time multiplex schema having a transmission sequence and transmission instants of transmitters of the MIMO radar being identified by optimizing the following mathematical relationships:

$$|\mathrm{Cov}^{WS}(\underline{d}^{pulses,x}, t, \rho)| = \text{minimal}$$

$$|\mathrm{Cov}^{WS}(\underline{d}^{pulses,y}, t, \rho)| = \text{minimal}$$

having the parameters:
$d^{pulses,x}$ . . . X positions of the transmitters in the sequence in which they transmit
$d^{pulses,y}$ . . . Y positions of the transmitters in the sequence in which they transmit
t . . . transmission instants
ρ . . . transmission energies
$\mathrm{Cov}^{WS}$ . . . weighted sample covariance
in which:

$$\mathrm{Cov}^{WS}(\underline{x}, \underline{y}, \underline{w}) := E^{WS}([\underline{x} - E^{WS}(\underline{x}, \underline{w}) \cdot \underline{1}] \otimes [\underline{y} - E^{WS}(\underline{y}, \underline{w}) \cdot \underline{1}], \underline{w})$$

$$E^{WS}(\underline{x}, \underline{w}) := \frac{1}{\sum_{j=1}^{K} wj} \sum_{i=1}^{K} xi \cdot wi$$

having the parameters:
w . . . weight vector
$E^{WS}$ . . . weighted sample mean
⊗ . . . element-wise multiplication According to a third aspect, the object is achieved with a method for operating a MIMO radar, an influence of an object motion on an angle estimate being substantially eliminated, at least two transmitters having different activation time frames being used, the transmitters being activated a different number of times in their activation time frames so that a common center instant for the transmitters is furnished for the activation time frames.

Advantageously, an improved angle estimate for a MIMO radar can be carried out according to the present invention. For example, the more uncorrelated individual parameters of the aforementioned mathematical relationships are, the more accurately the estimate can be carried out. Because the transmission instants are important for the Doppler effect, and the positions of the transmitting antennas are important for the angle estimate, the aforesaid variables cannot influence one another if they are uncorrelated. The result is that, advantageously, the angle estimate can be carried out as exactly as if the target or object were not moving. Advantageously, the switching concept according to the present invention in accordance with the first and second aspect can be used for planar antennas, and in accordance with the third aspect can be used for different antenna types or topologies (e.g. for planar antennas, lens antennas, antenna arrays, etc.).

A preferred embodiment of the method according to the present invention provides that an optimization of the following mathematical relationships is carried out:

$$\text{Cov}^{WS}(d^{pulses,x}, t, \rho) = 0$$

$$\text{Cov}^{WS}(d^{pulses,y}, t, \rho) = 0.$$

It is thereby possible to implement an optimum switching concept in consideration of the transmission energies of the transmitters, in which concept the motion of the targets relative to the radar has no influence at all on the angle estimate.

A further advantageous refinement of the method according to the present invention provides that one of the transmitters is respectively activated with a time offset from the other transmitter, the respectively later-activated transmitter being activated, in a boundary region of its activation time frame, at least one less time than the other transmitter, the transmitter being not activated the same number of times at the beginning and at the end of its activation time frame.

The advantageous result of this is that the two transmitters have the same observation instant. Equidistance of the transmission instants means that a Fourier transform is usable, enabling a very efficient evaluation algorithm. An asymmetry in the activations of the transmitters within their time frames is established in such a way that an identical center instant is achieved.

A further preferred embodiment of the method according to the present invention provides that a discrete Fourier transform is carried out for signal evaluation, the sampled values of the transmitter being made up by way of zero paddings to the number of sampled values of the transmitter, a phase difference in the sampled signals of the transmitters being corrected, and the sampled signals of the transmitters being equalized by way of an amplitude factor.

The missing measured value for subsequent execution of the Fourier transform is thereby advantageously furnished. A Fourier transform that can be efficiently calculated, having identical frequency bins, is thereby advantageously enabled. The calculation performance and costs for the evaluation algorithm can thereby advantageously be optimized.

A further preferred embodiment of the method according to the present invention provides that a transmission-ramp-based radar modulation is used for the signals of the transmitters. It is thereby possible to use proven modulation methods, which can effectively determine distance and relative velocity, for the switching concept according to the present invention.

A further preferred embodiment of the method according to the present invention provides that two transmitters, or respective pairs of transmitters, are provided. Advantageously, the switching concept according to the present invention can be implemented particularly efficiently with an even number of transmitters, since this is a particularly simple possibility for superimposing the effective observation instants.

The invention will be described below in detail with further features and advantages, with reference to several Figures. Previously known principles of a MIMO radar will not be discussed in detail.

DETAILED DESCRIPTION OF THE INVENTION

In order to allow the advantages of MIMO radar to be utilized, the transmitted signals that are used should preferably be orthogonal to one another, i.e. should exhibit no dependencies on one another. There are in principle three possibilities for this, but all have specific disadvantages:
  code multiplexing in fast or slow time has a high level of technical complexity and only limited orthogonality;
  frequency multiplexing produces a wavelength-dependent phase shift and Doppler shift;
  time multiplexing, in a context of object motions between switchovers, results in different phases, complicating the subsequent angle estimate.

Closer consideration will be given hereinafter exclusively to the time multiplexing method, since it can be implemented relatively simply in terms of circuit technology and is thus economical. The present invention proposes a time multiplex switching concept which is notable for the fact that object motions between switchovers of the transmitters have no influence on the subsequent angle estimate.

Figure 1:
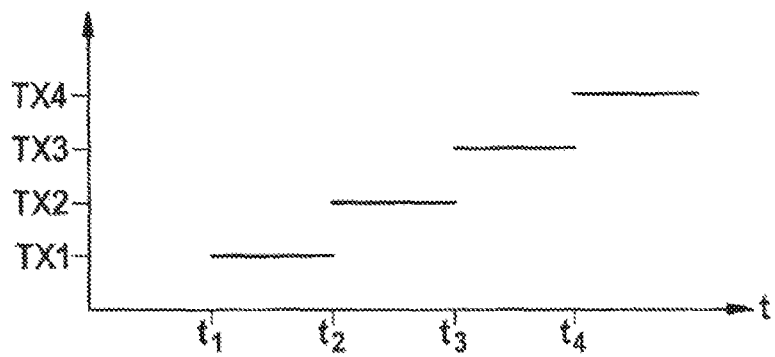
FIG. 1 shows a conventional time multiplex schema for a MIMO radar.

FIG. 1 shows a conventional time multiplex schema with no limitation to a specific type of transmitted signal modulation. For example, a chirp sequence modulation or an FMCW modulation could be used therefor. All that is to be indicated is that at four instants t1, t2, t3, and t4, a different transmitter TX1, TX2, TX3, TX4 is respectively switched on or activated for a certain time period. Because this results, for targets moving relative to the radar, in a phase shift, a subsequent angle estimate can yield inaccurate results.

Provision is made according to the present invention that the received baseband radar signal is described by a mathematical model. For the angle estimate, the Cramer-Rao bound (CRB) is calculated. This represents in principle the maximum possible accuracy that can be achieved with an unbiased angle estimator, and is therefore independent of the evaluation algorithm that is used. What is derived from the Cramer-Rao bound is a condition among the positions of the transmitters TXn, the transmission sequence, and the transmission instant that should be met in order to enable a maximally accurate angle estimate.

A variety of optimum time multiplex schemata can then be derived from this model. The angle estimate takes into account not only the phase differences in the baseband signals that occur as a result of angle, but also the phase differences resulting from the Doppler effect. The transmission times and positions of the respectively transmitting transmitters TXn are selected optimally so that the transmission positions of the transmitters TXn are as uncorrelated as possible in terms of the sequence in which they transmit and their transmission times. The result is to achieve for the angle estimate an accuracy which is as great as if the target object were not moving at all relative to the radar. Advantageously, this principle can be used both for elevation angle estimation and for azimuth angle estimation. The result is that in this manner, a technical potential of MIMO radar can advantageously be fully exploited.

In order to achieve a maximally accurate angle estimate, the following mathematical expression must be optimized:

$$d^{pulses,opt} = \arg\max_{d^{pulses}} \left[ \text{Var}^S(d^{pulses}) - (\text{Cov}^S(d^{pulses}, t))^2 / \text{Var}^S(t) \right] \quad (1)$$

having the parameters:
$d^{pulses,opt}$ ... optimized positions of the transmitters in the sequence in which they transmit
$d^{pulses}$ ... positions of the transmitters in the sequence in which they transmit
t ... transmission instants
$\text{Var}^S$ ... sample variance
$\text{Cov}^S$ ... sample covariance.

The sample covariance of two vectors x, y ∈ [?] $^K$ is defined as $$\text{Cov}^S := 1/K \, \Sigma^T (t=\tau)_1 \equiv (x_i - E^S(x))(y_i - E^S(y)) \quad (2)$$

with the sample mean $$E^S(\underline{x}) := 1/K \sum_{i=1}^{K} x_i. \quad (3)$$

The sample variance $\text{Var}^S$ is defined as follows:

$$\text{Var}^S(x):=\text{Cov}^S(x,x) \quad (4).$$

The goal is to maximize, by way of the optimization according to the present invention, the first term of formula (1), which expresses how far apart the transmitting transmitters TX1 ... TXn should be spaced in physical terms. The closer they are located to one another, the more inaccurately the estimate of the angle can be carried out, since the time difference in reflected signals for transmitters TX1 ... TXn thereby becomes very small. This means that when multiple transmitting antennas TX1 ... TXn are available for selection, those which are physically spaced the farthest apart from one another should preferably be selected.

The second term of formula (1) expresses how the transmission sequence $d^{pulses}$ and the transmission instants t are related; the less these variables are correlated, the better it is for an accurate angle estimate.

It is entirely conceivable in this context for a maximization of the first term and a minimization of the second term of formula (1) not to be simultaneously possible. It can thus be more favorable to bring the second term not exactly to zero, since that makes the first term larger.

The result $d^{pulses,opt}$ defines the positions of transmitters TX1 ... TXn in the sequence in which they transmit, so that the angle estimate is as accurate as possible.

For the case in which, for whatever reason, the disposition of the antennas of transmitters TX1 ... TXn in a two-dimensional planar array is already predefined, then according to the present invention the following mathematical relationships must be optimized in order to achieve a maximally accurate angle estimate:

$$|\text{Cov}^{WS}(d^{pulses,x},t,\rho)|=\text{minimal}$$

$$|\text{Cov}^{WS}(d^{pulses,y},t,\rho)|=\text{minimal}$$

having the parameters:
$d^{pulses,x}$ ... X positions of the transmitters in the sequence in which they transmit
$d^{pulses,y}$ ... Y positions of the transmitters in the sequence in which they transmit
t ... transmission instants
$\text{Cov}^{WS}$ ... weighted sample covariance
ρ ... transmission energies ρ contains, for each pulse, the product of transmission power output and time, and weights the covariance. If the positions of transmitters TX1 ... TXn, or of a number of transmitters TX1 ... TXn is already predefined for whatever reason, formulas (5) and (6) thus predefine how the transmitting antennas of transmitters TX1 ... TXn are to be activated.

The weighted sample covariance $\text{Cov}^{WS}$ of two vectors x, y ∈ [?] $^K$ and the weighting vector w ∈ [?] $^K$ are defined as $$\text{Cov}^{WS}(x,y,w):=E^{WS}([x-E^{WS}(x,w)\cdot 1] \otimes [y-E^{WS}(y,w)\cdot 1], w) \quad (7)$$

with the weighted sample mean:

$$E^{WS}(\underline{x},\underline{w}) := \frac{1}{\sum_{j=1}^{K} wj} \sum_{i=1}^{K} xi \cdot wi \quad (8)$$

where 1 represents a vector whose elements are all equal to 1.

When formulas (5) and (6) are zero, the situation is just as good as in the stationary case if the target were not moving. What is ultimately important is therefore which degrees of freedom are available in the design of the radar sensor. If nothing is predefined, formulas (5) and (6) can in any case be zeroed.

Formulas (5) and (6), which each have three unknown vectors, allow a determination of the remaining unknown vectors if at least one vector is known. They can be read in various ways: for example, the transmission positions of transmitters TX1 . . . TXn, and also the transmission power levels at which transmitters TX1 . . . TXn are transmitting, can be defined. In this case the transmission sequence and the instants can be determined. Or the transmission sequence and transmission instants are known, and the transmission energy is to be determined. In this way, different types of radar sensors can advantageously be comprehensively configured or designed.

An important special case exists when all the transmitters TX1 . . . TXn use the same electromagnetic transmission energy for each pulse:

$$\rho \propto 1 \tag{9}$$

In this case the weighted sample covariance $Cov^{WS}$ is identical to the sample covariance $Cov^S$ $$|Cov^{WS}(d^{pulses,x},t,\rho)|=|Cov^S(d^{pulses,x},t)| \tag{10}$$

$$|Cov^{WS}(d^{pulses,y},t,\rho)|=|Cov^S(d^{pulses,y},t)| \tag{11}$$

If the transmission positions are defined and if transmitters TX1 . . . TXn are transmitting at the same time intervals, the conditions of equations (10) and (11) can then be met by selecting the positions of transmitters TX1 . . . TXn in $d^{pulses,x}$ and $d^{pulses,y}$ to be symmetrical.

If $Cov^S(d^{pulses},t)=0$, the maximum angular accuracy is as great k-L as if the target were not moving relative to the radar.

This will be explained below with reference to several examples:

FIGS. 3 to 7 show examples of optimum switching sequences for different number of pulses, which all conform to formula (1) and to formulas (5) and (6). $\rho$ has absolutely no influence here, since all the transmitters TX1 . . . TXn are transmitting for the same amount of time and at the same power output.

Figure 3:
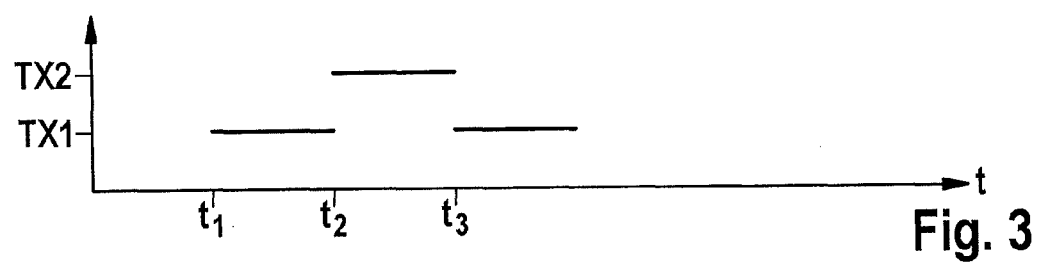
FIGS. 3 to 7 show several embodiments of time multiplex schemata according to the present invention for a MIMO radar.

FIG. 3 shows an embodiment of an optimal time multiplex schema having two transmitters TX1 and TX2 and a number of pulses $N_{pulses}$=3.

Figure 4:
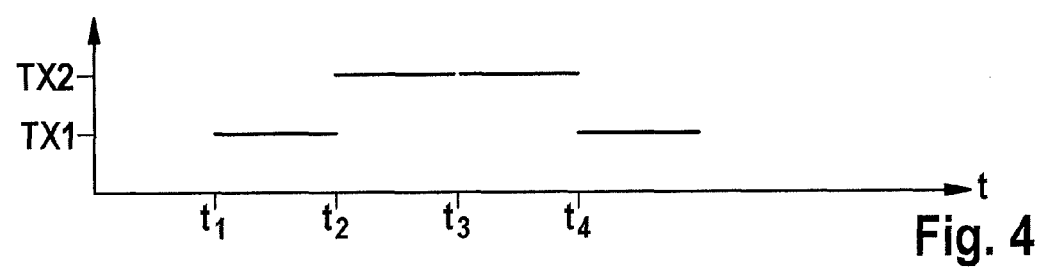

FIG. 4 shows an embodiment of an optimal time multiplex schema having two transmitters TX1 and TX2 and a number of pulses $N_{pulses}$=4.

Figure 5:
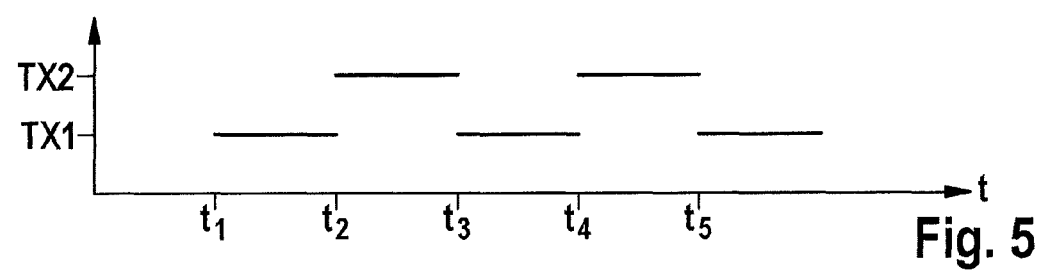

FIG. 5 shows an embodiment of an optimal time multiplex schema having two transmitters TX1 and TX2 and a number of pulses $N_{pulses}$=5.

Figure 6:
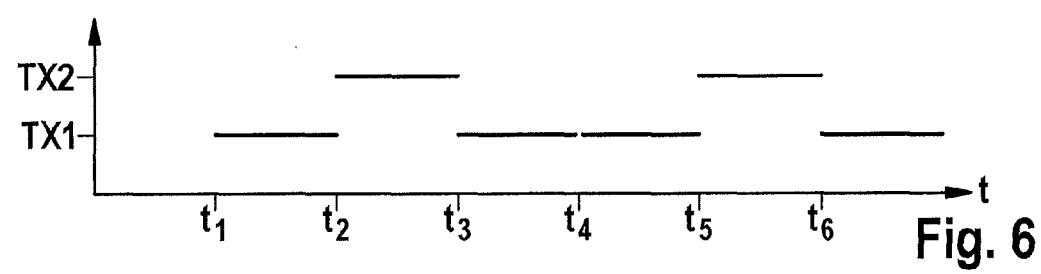

FIG. 6 shows an embodiment of an optimal time multiplex schema having two transmitters TX1 and TX2 and a number of pulses $N_{pulses}$=6.

Figure 7:
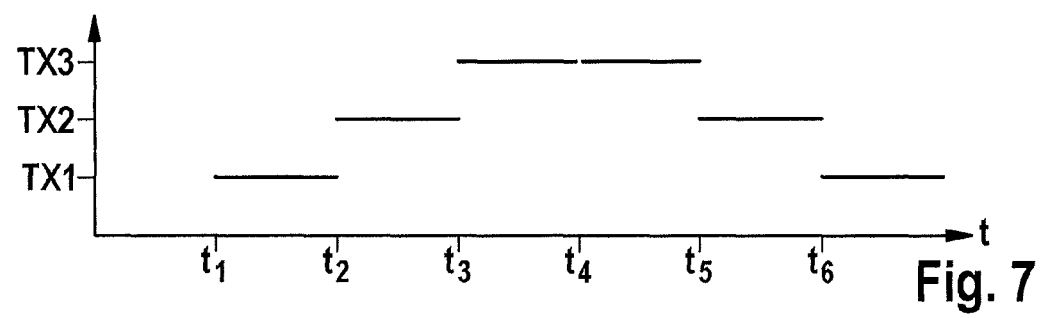

FIG. 7 shows an embodiment of an optimal time multiplex schema having three transmitters TX1, TX2, and TX3 and a number of pulses $N_{pulses}$=6.

Figure 2:
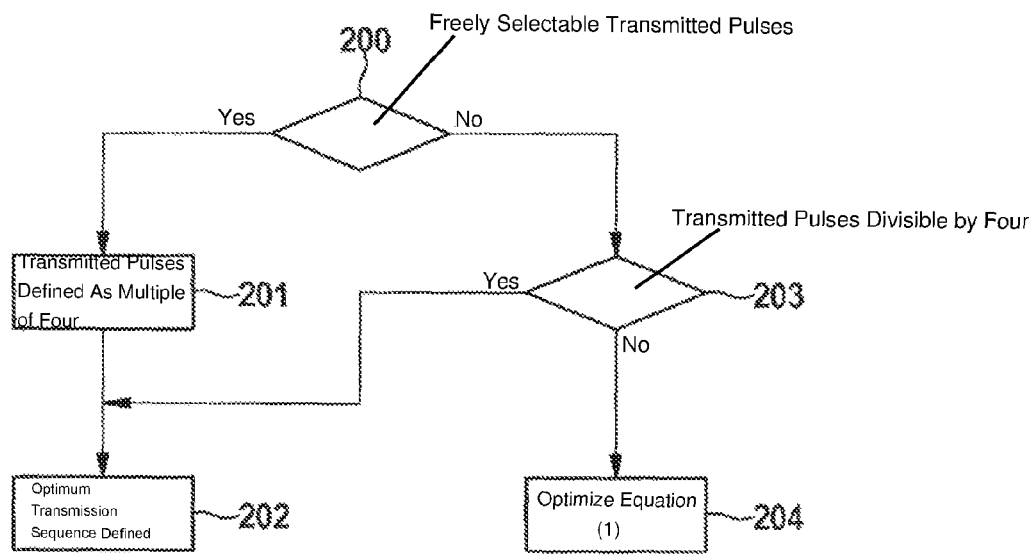
FIG. 2 schematically shows a method for determining an optimum transmission sequence for a MIMO radar.

FIG. 2 is a schematic flow chart for identifying $d^{pulses,opt}$. A step 200 queries whether the number of transmitted pulses $N_{pulses}$ is freely selectable. If so, in a further step 201 the number of pulses $N_{pulses}$ is defined as a multiple of four. An optimum transmission sequence $d^{pulses,opt}$ is then defined in a step 202 according to the following schema:

$$d^{pulses,opt}=D_{TX}[0,1,1,0,\ldots]^T \tag{12}$$

having the parameters:
$D_{TX}$ . . . greatest possible geometrical spacing between two transmitters
T . . . transposed vector.

If the number of transmitted pulses $N_{pulses}$ is not freely selectable, a further step 203 checks whether the number of transmitted pulses $N_{pulses}$ is divisible by four. If so, the aforesaid step 202 is carried out. If the number of pulses $N_{pulses}$ is not divisible by four, in a step 204 the optimum transmission sequence is identified by optimizing equation (1). It is thus evident that for a number of transmitted pulses $N_{pulses}$ that is a multiple of 4 (e.g. 8, 12, 16, etc.), a possible optimum solution can already be identified a priori in simple fashion.

Formula (12) advantageously results in simple scalability of the transmission sequence, since only the spacing $D_{TX}$ participates as a constant factor in formula (12).

Table 1 below shows possible optimum solutions for the transmission sequence for various numbers of transmitted pulses $N_{pulses}$:

| $N_{pulses}$ | Optimum $d^{pulses}/D_{TX}$ | $Cov^S(d^{pulses},t)$ |
|---|---|---|
| 3 | $[0,1,0]^T$ | =0 |
| 4 | $[0,1,1,0]^T$ | =0 |
| 5 | $[0,1,0,1,0]^T$ | =0 |
|   | $[0,1,1,1,0]^T$ | =0 |
| 6 | $[0,1,1,0,1,0]^T$ | ≠0 |
|   | $[0,1,0,1,1,0]^T$ | ≠0 |
|   | $[0,1,1,0,0,1]^T$ | ≠0 |
| 7 | $[0,1,1,0,1,1,0]^T$ | =0 |
|   | $[0,0,1,1,1,0,0]^T$ | =0 |
|   | $[0,1,1,1,1,0,0,1]^T$ | =0 |
|   | $[0,1,0,1,0,1,0]^T$ | =0 |

It is evident, for example, that for 6 transmitted pulses it is better to have the sample covariance $Cov^S$ not be equal to zero, since formula (1) yields a more favorable result in that case.

Figure 8:
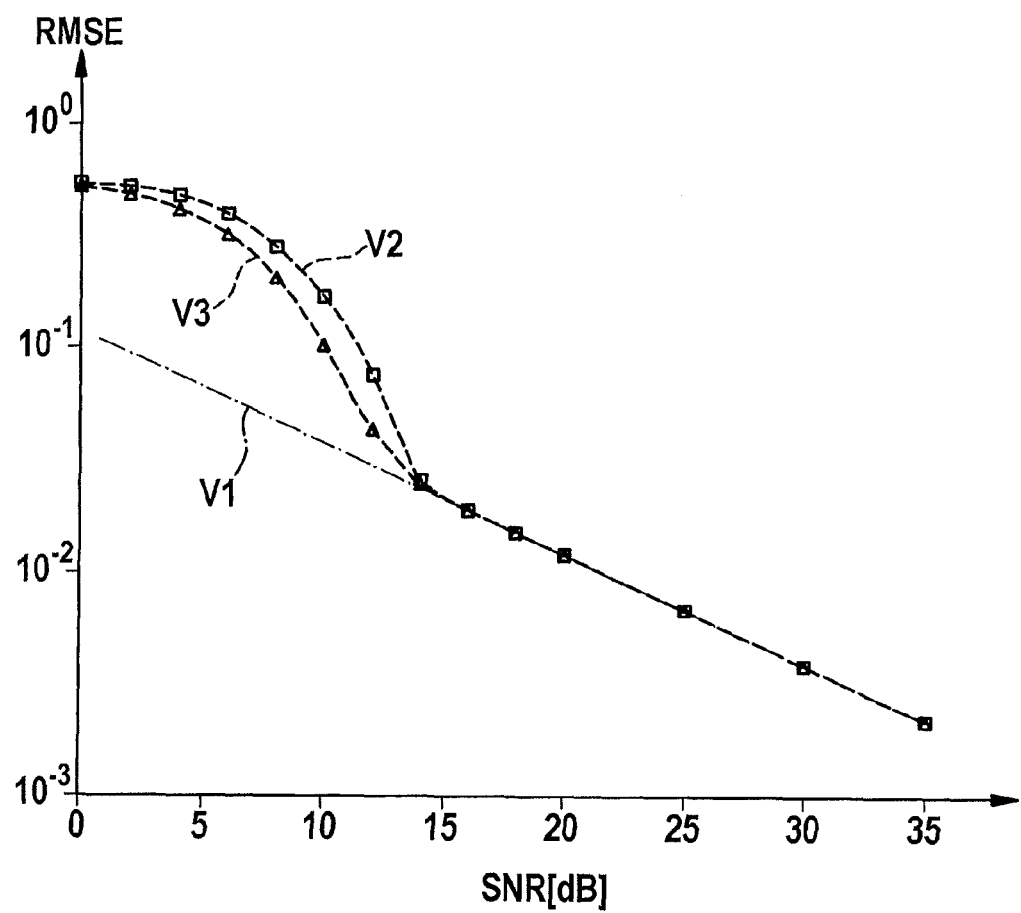
FIG. 8 shows simulation results for the switching concept according to the present invention.

FIG. 8 shows simulation results that confirm the effectiveness of the switching concept according to the present invention. The signal to noise ratio SNR, which depends e.g. on the transmission power level of transmitters TX1 . . . TXn or on the distance of the target from the MIMO radar, is plotted on the X axis. The outermost two of several (for example, four) transmitters TX1 . . . TXn are preferably used for transmission. The number of receivers is assumed to be four.

The root mean square error (RMSE) for the estimated angle is plotted on the Y axis. Curve V1 is calculated for the case of optimum transmission using four transmitters. Curve V2 is a simulation of the MIMO radar sensor in real-time mode. It is evident that above an SNR of approx. 14 dB, curves V1 and V2 are substantially identical. Below approx. 14 dB, curves V1 and V2 no longer coincide, but this is essentially uncritical since radar sensors are as a rule not operated in this region. Curve V3 is a simulation using the assumption that the target is not moving; in this case the time multiplex schema used is fairly uncritical, and only the transmitters identical to those for curve V2 should be used. It is apparent that above an SNR of approx. 14 dB, curves V2 and V3 are also substantially identical. What this means is that when the optimum time multiplex schema is used, the angle estimate even for moving targets is just as good as if the target were not moving relative to the radar.

A particularly effective possibility for implementing the switching concept according to the present invention with no influence on transmitted energies $\rho$ is provided by a switching concept for two transmitters TX1 . . . TXn or groups of two transmitters TX1 . . . TXn each, which concept, in contrast to the switching concepts above that are provided only for planar antennas, are provided for a plurality of different antenna types. What is proposed is a subsequent corresponding evaluation algorithm using Fourier transformation.

Figure 9:
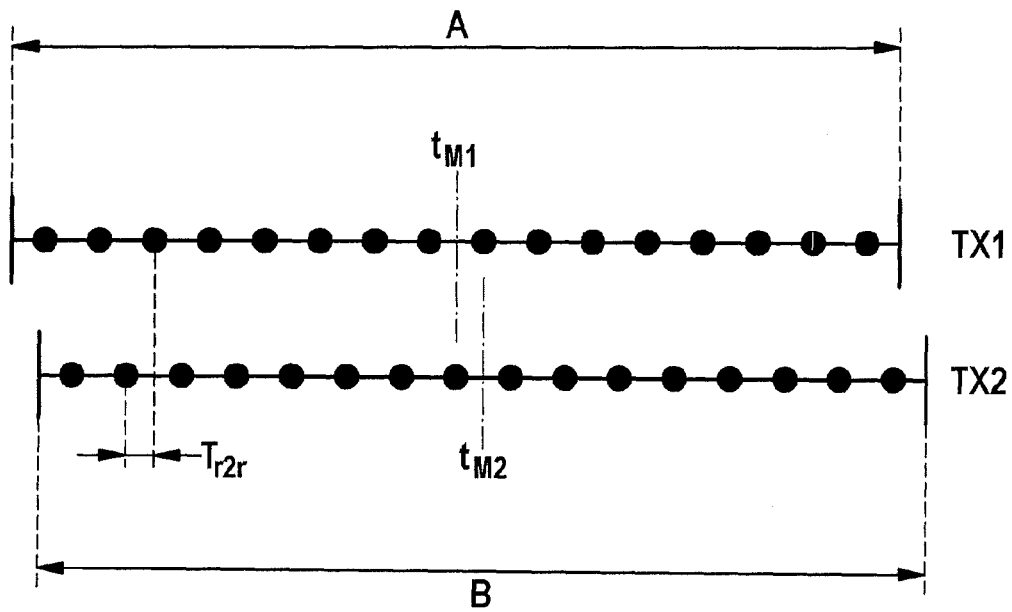
FIG. 9 shows a further conventional time multiple schema.
Figure 11:
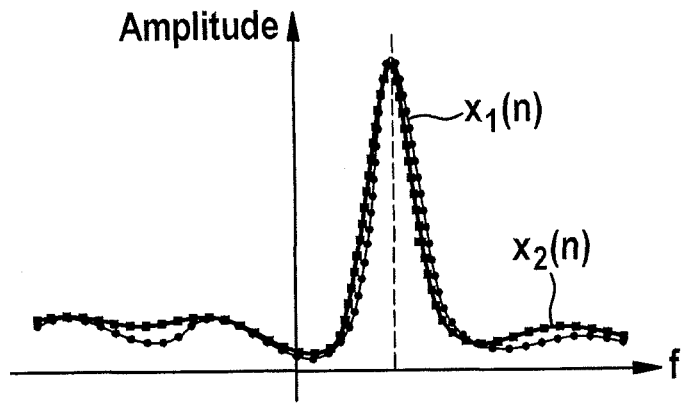
FIG. 11 schematically depicts a conventional signal evaluation operation by way of a discrete Fourier transform.

FIG. 9 shows a conventional time multiplex switching schema for two transmitters TX1, TX2 that each transmit with a time offset from one another (e.g. frequency-modulated ramp signals) and each transmit or are activated the same number of times within their respective time frames A, B. As a result thereof, center instants or effective measurement instants $t_{M1}$, $t_{M2}$ of the two time frames or observation time periods A, B of the two transmitters TX1, TX2 are different, thereby disadvantageously complicating a subsequent angle estimate due to a phase difference $\Delta\Phi$ caused by an object motion. FIG. 11 is a schematic depiction of signal curves in the frequency region with peaks at the same point.

Figure 10:
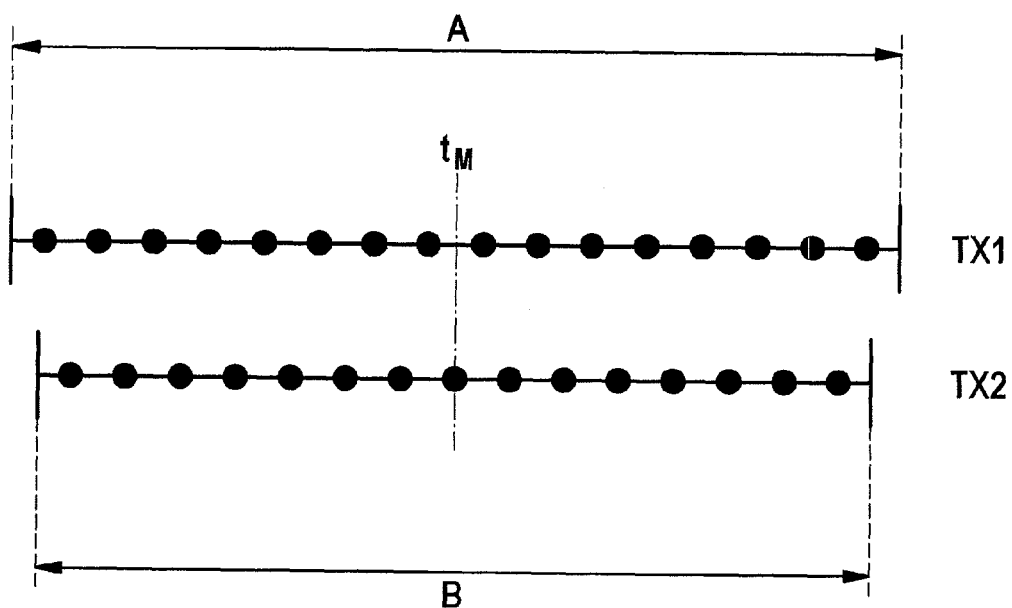
FIG. 10 shows a further embodiment of a time multiplex schema according to the present invention.

Provision is now made that the second transmitter TX2 is not activated, or does not transmit, at least one time at the end of its time frame B, yielding a number of activations (or switch states or transmitted pulses) that is reduced with respect to the first transmitter TX1. This results in an identical center instant or reference instant $t_M$ for both transmitters TX1, TX2, which means that the two transmitters TX1, TX2 have equivalently "observed" the same thing, except using different observation time spans A, B. The principle of this switching concept is depicted in FIG. 10.

It is also conceivable for the second transmitter TX2 to be not activated several times (not depicted) during its time frame B, although in this case the number of non-activations should be distributed identically at the beginning and the end of the time frame B so that symmetry in terms of time frame B, and commonality of the center instant $t_M$ for the two time frames A, B, are retained. Thanks to the identical center instant $t_M$, an object motion has no influence on the angle estimate. Different antenna topologies (e.g. planar antennas or isotropic antennas, lens antennas, antenna arrays, etc.) for a MIMO radar can thereby advantageously be used with no influence from object motions on angle estimates.

Figure 12:
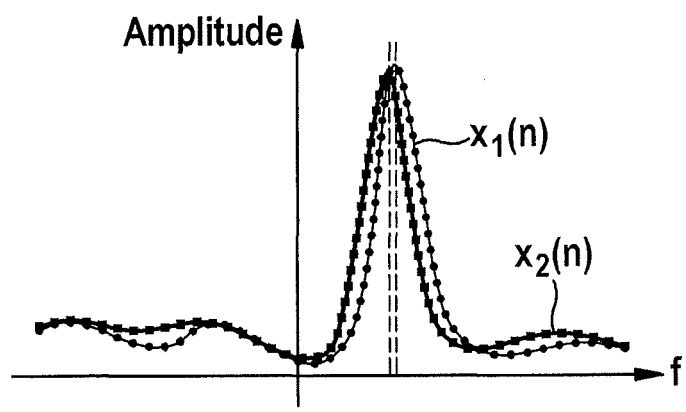
FIG. 12 schematically depicts an uncorrected signal evaluation operation by way of a discrete Fourier transform.

As a consequence of the different number of times transmitters TX1, TX2 are activated during their time frames A, B, a different number of sampled values for TX1 and TX2 thus results. This means that the same frequency range exists in the frequency region for TX1 and TX2, but that the two transmitters TX1, TX2 have been sampled using different time patterns. The result of this, due to the different DFT length thereby generated, is a phase difference $\Delta\Phi\neq 0$ between the received signals for TX1 and TX2. A corresponding offset of, for example, one bin for the peak values of TX1 and TX2 in the frequency region is evident in FIG. 12.

In order now to allow an efficient discrete Fourier transform to be carried out, the sampled signal $x_2(n)$ of TX2 is filled out by way of zero paddings to the same length as the signal $x_1(n)$ before the Fourier transform is carried out. The consequence of the zero padding is that the Fourier transform for TX1 and TX2 processes an identical even number of sampled values, the number preferably being a power of two. The target aimed at by both transmitters TX1, TX2 thus exhibits the same frequency bin pattern.

Because the activation instants of the two transmitters TX1, TX2 are offset from one another in accordance with the following equation:

$$t_{2,n} = t_{1,n} + T_{r2r} \quad (13)$$

having the parameters:
$t_{2,n}$ activation instant of transmitter TX2
$t_{1,n}$ activation instant of transmitter TX1
$T_{r2r}$ time offset between TX1 and TX2, after the second Fourier transform the following phase difference results between the activations of TX1 and TX2 in frequency bin I:

$$\Delta\varphi = \frac{2\pi l T_{r2r}}{N \cdot N_{tx} \cdot T_{r2r}} = \frac{\pi l}{N} \quad (14)$$

having the parameters:
I index of the discrete frequency bin
N length of DFT
$N_{tx}$ number of transmitting antennas Because the phase difference $\Delta\varphi$ is fixed and known, it can be compensated for before angle estimation. Because the signal $x_2(n)$ has one less sampled value than the signal $x_1(n)$, the amplitude for the second transmitter TX2 is lower than for the first transmitter TX1. This amplitude factor depends on the window function selected. The "benefit" of the window function for the first transmitter TX1 is:

$$G_1 = \left(\sum_{n=0}^{N-1} w_1^2(n)\right) \cdot \left(\sum_{n=0}^{N-1} w_1(n)\right)^{-2} \quad (15)$$

having the parameters:
w1(n) window function of Fourier transform for the first transmitter TX1
w2(n) window function of Fourier transform for the second transmitter TX2.

Because, for the second transmitter, only N–1 values are different from zero, the following applies:

$$G_2 = \left(\sum_{n=0}^{N-2} w_2^2(n)\right) \cdot \left(\sum_{n=0}^{N-2} w_2(n)\right)^{-2} \quad (16)$$

The amplitude of the signal from TX1 is thus lower by a factor G2/G1 than the amplitude of the signal from TX1; this factor can likewise be compensated for before angle estimation.

Figure 13:
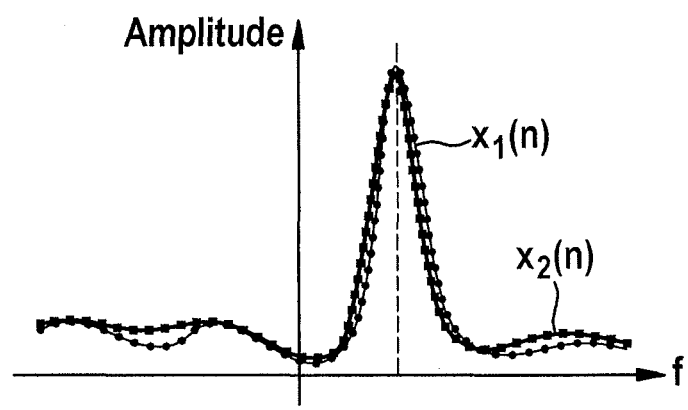
FIG. 13 schematically depicts a corrected signal evaluation operation by way of a discrete Fourier transform.

FIG. 13 indicates that after the aforesaid zero padding for the signal from TX2 has been carried out, the peaks of the sampled signals from TX1 and TX2 are again uniformly located at the same frequency bin, with the result that the estimating algorithm can be carried out in simple fashion by Fourier transformation.

The aforesaid concept is also conceivable for three transmitting antennas, an offset of the center instants being reduced in this case.

The above-described variant functions particularly efficiently, however, with two transmitters TX1, TX2 or with an even number of transmitters TX1 . . . TXn that are combined into groups of two sensors each. It is thereby possible, for example, to use the first and second transmitter TX1, TX2 for azimuth angle estimation and the third and fourth transmitter TX3, TX4 for elevation angle estimation.

FMCW and chirp sequence modulation are two examples of modulation modes that are used particularly often in automotive radar systems and can be utilized for the switching concepts according to the present invention.

Figure 14:
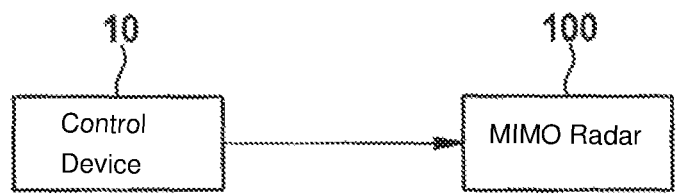
FIG. 14 is a schematic block diagram of a MIMO radar in which the switching concept according to the present invention is usable.

FIG. 14 shows an embodiment of a MIMO radar 100 according to the present invention. The method according to the present invention is implemented, preferably in software, in a control device 10, control being applied to the transmitters TX1 . . . TXn (not depicted) of MIMO radar 100 in accordance with the aforementioned principles according to the present invention.

In summary, the present invention proposes an improve switching concept for transmitting antennas of a coherent linear or two-dimensional MIMO radar or a MIMO radar having multiple antennas (co-located radar), which permits improved angle estimation.

The concept according to the present invention is advantageously notable for the fact that a transmission sequence of transmitters and their transmission instants are selected in such a way that object motions have no influence on the angle estimate. In addition, the proposed concept advantageously also has no negative effects at all on the estimate of distance and velocity. What is proposed is a switching concept that provides for time-multiplexed switching of a defined number of transmitters so as to enable a maximally optimal angle estimate in the context of the optimized Cramer-Rao bound.

Advantageously, the switching concept according to the present invention can be implemented for both one-dimensional and two-dimensional arrays having an arbitrary number of transmitters ≥2.

It is self-evident to one skilled in the art that the features of the invention that have been described can be suitably modified and combined with one another without deviating from the essence of the invention.

What is claimed is:

1. A method for operating a MIMO radar such that an influence of an object motion on an angle estimate is substantially eliminated, the method comprising:

identifying a time multiplex schema having a transmission sequence and transmission instants of transmitters of the MIMO radar by optimizing the following mathematical relationship:

$$\underline{d}^{pulses,opt} = \operatorname{argmax}_{\underline{d}^{pulses}}\left[\operatorname{Var}^S(\underline{d}^{pulses}) - (\operatorname{Cov}^S(\underline{d}^{pulses},t))^2 / \operatorname{Var}^S(t)\right]$$

wherein:
$d^{pulses,opt}$ is optimized positions of the transmitters in a sequence in which the transmitters transmit;
$d^{pulses}$ is positions of the transmitters in a sequence in which the transmitters transmit;
t is transmission instants;
$\operatorname{Var}^S$ is sample variance; and
$\operatorname{Cov}^S$ is sample covariance.

2. A method for operating a MIMO radar such that an influence of an object motion on an angle estimate is substantially eliminated, the method comprising:

identifying a time multiplex schema having a transmission sequence and transmission instants of transmitters of the MIMO radar by optimizing the following mathematical relationships:

$|\operatorname{Cov}^{WS}(\underline{d}^{pulses,x},t,\rho)|$=minimal $|\operatorname{Cov}^{WS}(\underline{d}^{pulses,y},t,\rho)|$=minimal wherein:
$d^{pulses,x}$ is X positions of the transmitters in a sequence in which the transmitters transmit;
$d^{pulses,y}$ is Y positions of the transmitters in the sequence in which the transmitters transmit;
t is transmission instants;
ρ is transmission energies;

$\operatorname{Cov}^{WS}$ is weighted sample covariance, wherein $$\operatorname{Cov}^{WS}(\underline{x},\underline{y},\underline{w}) := E^{WS}([\underline{x} - E^{WS}(\underline{x},\underline{w}) \cdot \underline{1}] \otimes [\underline{y} - E^{WS}(\underline{y},\underline{w}) \cdot \underline{1}], \underline{w})$$

$$E^{WS}(\underline{x},\underline{w}) := \frac{1}{\sum_{j=1}^{K} wj} \sum_{i=1}^{K} xi \cdot wi$$

wherein:
w is weight vector;
EWS is weighted sample mean; and
⊗ is element-wise multiplication.

3. The method as recited in claim 2, wherein an optimization of the following mathematical relationships is carried out:

$\operatorname{Cov}^{WS}(\underline{d}^{pulses,x},t,\rho)=0$ $\operatorname{Cov}^{WS}(\underline{d}^{pulses,y},t,\rho)=0.$ 4. A method for operating a MIMO radar such that an influence of an object motion on an angle estimate is substantially eliminated, the method comprising:

providing at least two transmitters having different activation time frames; and activating the transmitters a different number of times in the respective activation time frames of the transmitters such that a common center instant for the transmitters is provided for the activation time frames of the transmitters.

5. The method as recited in claim 4, wherein one of the transmitters is activated with a time offset from a second one of the transmitters, the respectively later-activated transmitter being activated, in a boundary region of the respective activation time frame, at least one less time than the other transmitter, the other transmitter being not activated the same number of times at the beginning and at the end of the respective activation time frame.

6. The method as recited in claim 5, wherein a discrete Fourier transform is carried out for signal evaluation, and wherein sampled values of the later-activated transmitter are made up by way of zero paddings to the number of sampled values of the other transmitter, and wherein by using an amplitude factor, (i) a phase difference in the sampled signals of the two transmitters is corrected, and (ii) the sampled signals of the two transmitters are equalized.

7. The method as recited in claim 6, wherein a transmission-ramp-based radar modulation is used for the signals of the transmitters.

8. The method as recited in claim 1, wherein the MIMO radar is situated in a motor vehicle, and wherein the method is used to identify at least one of the following variables: distance, relative velocity, and angle.

9. A non-transitory computer-readable data storage medium storing a computer program having program codes which, when executed on a computer, performs a method for operating a MIMO radar such that an influence of an object motion on an angle estimate is substantially eliminated, the method comprising:

identifying a time multiplex schema having a transmission sequence and transmission instants of transmitters of the MIMO radar by optimizing the following mathematical relationship:

$$\underline{d}^{pulses,opt} = \underset{\underline{d}^{pulses}}{\mathrm{argmax}}\left[\mathrm{Var}^S(\underline{d}^{pulses}) - (\mathrm{Cov}^S(\underline{d}^{pulses}, \underline{t}))^2 / \mathrm{Var}^S(\underline{t})\right]$$

wherein:
$\underline{d}^{pulses,opt}$ is optimized positions of the transmitters in a sequence in which the transmitters transmit;
$\underline{d}^{pulses}$ is positions of the transmitters in a sequence in which the transmitters transmit;
$\underline{t}$ is transmission instants;
$\mathrm{Var}^S$ is sample variance; and
$\mathrm{Cov}^S$ is sample covariance.

* * * * *